US010862702B2

(12) United States Patent
Ling et al.

(10) Patent No.: US 10,862,702 B2
(45) Date of Patent: *Dec. 8, 2020

(54) METHODS AND APPARATUS FOR INTELLIGENT POWER REDUCTION IN COMMUNICATIONS SYSTEMS

(71) Applicant: MaxLinear, Inc., Carlsbad, CA (US)

(72) Inventors: Curtis Ling, Carlsbad, CA (US); Timothy Gallagher, Encinitas, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 663 days.

This patent is subject to a terminal disclaimer.

(21) Appl. No.: 14/695,261

(22) Filed: Apr. 24, 2015

(65) Prior Publication Data

US 2015/0312051 A1 Oct. 29, 2015

Related U.S. Application Data

(63) Continuation of application No. 14/040,875, filed on Sep. 30, 2013, now Pat. No. 9,042,433, which is a
(Continued)

(51) Int. Cl.
*H04L 12/28* (2006.01)
*H04L 12/801* (2013.01)
(Continued)

(52) U.S. Cl.
CPC ......... *H04L 12/2863* (2013.01); *H04L 12/12* (2013.01); *H04L 12/2801* (2013.01);
(Continued)

(58) Field of Classification Search
None
See application file for complete search history.

(56) References Cited

U.S. PATENT DOCUMENTS 2,467,493 A * 4/1949 Pabich ............... B65H 1/18
271/130
2,514,852 A * 7/1950 Feucht ............... E21B 21/01
173/65
(Continued)

FOREIGN PATENT DOCUMENTS

JP 6050300 B2 * 12/2016 ........... H04B 7/0626

*Primary Examiner* — Berhanu Tadese
(74) *Attorney, Agent, or Firm* — McAndrews, Held & Malloy, Ltd.

(57) ABSTRACT

Methods and systems are provided for power control in communications devices. Bonding of channels in communication devices may be dynamically adjusted, such as responsive to requests for bandwidth adjustment. For example, bonded channel configurations may be adjusted based on power, such as to single channel configurations (or to channel configurations with small number of channels, such as relative to current configurations) for low power operations. Components (or functions thereof) used in conjunction with receiving and/or processing bonded channels may be dynamically adjusted. Such dynamic adjustments may be performed, for example, such as to maintain required synchronization and system information to facilitate rapid data transfer resumption upon demand.

24 Claims, 9 Drawing Sheets

Example of Channel Bonding Over Multiple Bands

Related U.S. Application Data continuation of application No. 13/023,478, filed on Feb. 8, 2011, now Pat. No. 8,548,034.

(60) Provisional application No. 61/302,507, filed on Feb. 8, 2010.

(51) Int. Cl.
*H04L 12/815* (2013.01)
*H04L 12/891* (2013.01)
*H04L 12/12* (2006.01)

(52) U.S. Cl.
CPC ...... *H04L 12/2861* (2013.01); *H04L 12/2865* (2013.01); *H04L 47/10* (2013.01); *H04L 47/22* (2013.01); *H04L 47/41* (2013.01); *Y02D 50/30* (2018.01)

(56) References Cited

U.S. PATENT DOCUMENTS

| | | | | | |
|---|---|---|---|---|---|
| 5,229,606 | A * | 7/1993 | Elings | ............ | B82Y 35/00 250/307 |
| 5,512,513 | A * | 4/1996 | MacHida | ............ | H01L 21/0217 438/624 |
| 5,537,435 | A * | 7/1996 | Carney | ............ | H04B 1/0014 370/210 |
| 5,590,156 | A * | 12/1996 | Carney | ............ | H04B 1/109 375/316 |
| 5,848,097 | A * | 12/1998 | Carney | ............ | H04B 1/38 375/219 |
| 5,893,168 | A * | 4/1999 | Qureshi | ............ | G11C 7/20 711/166 |
| 5,972,933 | A * | 10/1999 | Pfirrmann | ............ | A61K 31/549 514/222.5 |
| 6,050,300 | A * | 4/2000 | Schwert | ............ | F16L 55/1651 138/97 |
| 6,704,372 | B2 * | 3/2004 | Zhang | ............ | H04B 10/25754 375/316 |
| 6,760,342 | B1 * | 7/2004 | Skones | ............ | H04B 1/0003 370/343 |
| 6,898,235 | B1 * | 5/2005 | Carlin | ............ | H04B 1/001 342/147 |
| 7,155,179 | B1 * | 12/2006 | Rothenberg | ............ | H04B 1/525 455/114.2 |
| 7,263,362 | B1 * | 8/2007 | Young | ............ | H04L 12/2856 370/338 |
| 7,327,777 | B2 * | 2/2008 | Bergstrom | ............ | H04B 1/7102 375/140 |
| 7,336,706 | B2 * | 2/2008 | Krafft | ............ | H03K 5/1252 375/219 |
| 7,869,527 | B2 * | 1/2011 | Vetter | ............ | H04L 27/366 375/259 |
| 8,194,569 | B2 * | 6/2012 | Shorty | ............ | H04L 29/06027 370/254 |
| 8,442,281 | B2 * | 5/2013 | Jung | ............ | A61B 90/96 382/128 |
| 8,509,190 | B2 * | 8/2013 | Rofougaran | ............ | G06F 1/3209 370/331 |
| 8,548,034 | B2 * | 10/2013 | Ling | ............ | H04L 12/2801 375/219 |
| 8,675,615 | B2 * | 3/2014 | Anderson | ............ | H04W 88/06 370/337 |
| 9,042,433 | B2 * | 5/2015 | Ling | ............ | H04L 12/2801 375/222 |
| 9,363,755 | B2 * | 6/2016 | Shrivastava | ............ | H04W 76/28 |
| 9,565,469 | B2 * | 2/2017 | Monk | ............ | H04L 12/2898 |
| 9,749,068 | B2 * | 8/2017 | Khoshgard | ............ | H04B 17/21 |
| 9,787,463 | B2 * | 10/2017 | Ling | ............ | H04L 12/2801 |
| 9,883,457 | B2 * | 1/2018 | Zimmerman | ............ | H04W 72/04 |
| 10,251,129 | B2 * | 4/2019 | Carty | ............ | G06F 1/3209 |
| 10,263,801 | B2 * | 4/2019 | Ling | ............ | H04L 1/0003 |
| 2002/0142725 | A1 * | 10/2002 | Clelland | ............ | H04B 1/1027 455/63.1 |
| 2004/0252651 | A1 * | 12/2004 | Karlsen | ............ | H04L 29/06027 370/264 |
| 2005/0094714 | A1 * | 5/2005 | Robinson | ............ | H04B 1/0483 375/148 |
| 2006/0126660 | A1 * | 6/2006 | Denney | ............ | H04N 21/6168 370/468 |
| 2006/0133307 | A1 * | 6/2006 | Fukasawa | ............ | H04L 41/0816 370/328 |
| 2007/0115800 | A1 * | 5/2007 | Fonseka | ............ | H04L 1/0054 370/208 |
| 2007/0184782 | A1 * | 8/2007 | Sahota | ............ | H04B 1/10 455/63.1 |
| 2008/0018427 | A1 * | 1/2008 | Ezra | ............ | H04L 1/22 340/7.32 |
| 2009/0213770 | A1 * | 8/2009 | Mu | ............ | H04B 1/525 370/281 |
| 2009/0249421 | A1 * | 10/2009 | Liu | ............ | H04L 12/2801 725/116 |
| 2009/0303883 | A1 * | 12/2009 | Kucharczyk | ............ | H04L 12/4645 370/241 |
| 2010/0040178 | A1 * | 2/2010 | Sutton | ............ | H04B 7/0845 375/345 |
| 2010/0159837 | A1 * | 6/2010 | Dent | ............ | H04B 1/525 455/63.1 |
| 2010/0167655 | A1 * | 7/2010 | Muhammad | ............ | H04B 1/525 455/63.1 |
| 2010/0226390 | A1 * | 9/2010 | Yan | ............ | H04L 12/2801 370/468 |
| 2010/0304772 | A1 * | 12/2010 | Wang | ............ | H04W 56/003 455/509 |
| 2011/0149714 | A1 * | 6/2011 | Rimini | ............ | H04B 1/525 370/201 |
| 2013/0016798 | A1 * | 1/2013 | Velazquez | ............ | H04B 1/001 375/340 |
| 2013/0044791 | A1 * | 2/2013 | Rimini | ............ | H04B 1/30 375/219 |
| 2014/0056316 | A1 * | 2/2014 | Ling | ............ | H04L 12/2801 370/468 |
| 2014/0194071 | A1 * | 7/2014 | Wyville | ............ | H04B 1/62 455/73 |
| 2014/0355474 | A1 * | 12/2014 | Du | ............ | H04L 43/0823 370/252 |
| 2016/0302028 | A1 * | 10/2016 | Ling | ............ | H04B 5/0037 |
| 2017/0223146 | A1 * | 8/2017 | Cavgalar | ............ | H04L 12/66 |

* cited by examiner

Example Data Communications System

One Embodiment of a Cable Modem

Example of Channel Bonding

Example Modem Implementation

Example of Channel Bonding
Over Multiple Bands

Embodiment of a Process for Performing a Lower Power Handoff

METHODS AND APPARATUS FOR
INTELLIGENT POWER REDUCTION IN
COMMUNICATIONS SYSTEMS

CROSS-REFERENCE TO RELATED
APPLICATIONS

This application is a continuation of U.S. patent application Ser. No. 14/040,875 filed Sep. 30, 2013, which is a continuation of U.S. patent application Ser. No. 13/023,478 filed Feb. 8, 2011, which, in turn, claims priority to U.S. Provisional Patent Application Ser. No. 61/302,507 filed Feb. 8, 2010. Each of the above identified applications is hereby incorporated herein by reference in its entirety.

FIELD OF THE INVENTION

The present invention relates generally to communications systems, including cable systems. More particularly, but not exclusively, the invention relates to methods and apparatus for providing intelligent power reduction by adjusting communications device configurations, operation, and channel bonding.

BACKGROUND

In data communication systems such as those implementing the Data Over Cable Service Interface Specification (DOCSIS) standard used for data communication over a cable medium, it is desired to expand the data bandwidth available to end users by combining several receive and transmit channels together in order to obtain their aggregate bandwidth. In DOCSIS systems this is often referred to as "channel bonding." While use of channel bonding can offer higher data rates, improvements come at the cost of additional power consumption.

Consequently, there is a need in the art for apparatus and methods for maintaining higher data rates while also controlling power consumption in periods of low data demand or idle operation.

SUMMARY

The present invention relates generally to communications systems, including cable or wired communications systems. More particularly, but not exclusively, the invention relates to apparatus and methods for reducing power consumption in a modem by dynamically adjusting channel bonding and/or dynamically adjusting the operating mode from a wideband mode to a narrowband mode or vice-versa.

In one aspect the invention relates to a method for controlling power consumption in a modem, such as a cable data modem. The method may include, for example, bonding a plurality of channels to create a first bonded channel set having a first number of channels and processing data provided from the first bonded channel set in the modem. The processing may include, for example, providing output baseband data from modulated data received from one or more of the channels, and/or providing images, video, audio, and/or other data or information. The process may further include receiving a request for bandwidth adjustment, and, responsive to the request for bandwidth adjustment, changing the number of channels in the first bonded channel set so as to define a second bonded channel set having a second number of channels. The process may further include processing data provided from the second bonded channel set in the modem.

In another aspect, the present invention relates to a method for power reduction in a modem having a plurality of receiver front end modules configured to process a plurality of sets of bonded channels. The method may include, for example, receiving a request for power reduction, setting a first front end module of the plurality of front end modules to a narrowband operating mode, tuning the first front end module to a primary channel and providing a first processed primary channel output; wherein a second front end module of the plurality of front end modules is configured to receive the primary channel and provide, as an output, a second processed primary channel signal to a demodulator module, and transitioning processing in the demodulation module of the second processed primary channel signal to the first processed primary channel signal. The method may further include reducing power consumption of the second front end module after said transitioning. The reducing power consumption may include turning off the second front end module.

In another aspect, the present invention relates to a method for controlling power consumption in a modem. The method may include, for example, detecting a decreased demand for user data in the modem, and dynamically reconfiguring modem operation responsive to said detecting, wherein the dynamically reconfiguring may include configuring the modem so as to maintain system synchronization.

In another aspect, the present invention relates to an apparatus for reducing power consumption in a modem. The apparatus may include, for example, a first circuit configured to generate a request for power reduction, and a second circuit configured to dynamically adjust, responsive to the request, a channel bonding configuration.

In another aspect, the present invention relates to a method for controlling power consumption in a modem. The method may include, for example, bonding a plurality of channels to create a bonded channel set. The method may further include processing data provided from the bonded channel set in the modem, receiving a demand for bandwidth reduction, and transitioning processing of data in the modem from data provided from the bonded channel set to data provided from a single channel.

In another aspect, the invention relates to a method for power reduction in a modem. The mode may include, for example, a plurality of receiver front end modules configured to process a plurality of sets of bonded channels. The method may include, for example, receiving a request for power reduction, setting a first front end module of the plurality of front end modules to a narrowband operating mode, tuning the first front end module to a primary channel, and providing a first processed primary channel output. A second front end module of the plurality of front end modules may be configured to receive the primary channel and provide, as an output, a second processed primary channel signal to a demodulator module. The method may further include transitioning processing in the demodulation module of the second processed primary channel signal to the first processed primary channel signal.

In another aspect, the invention relates to a method for controlling power consumption in a modem. The method may include, for example, detecting a decreased demand for user data in the modem and dynamically reconfiguring modem operation responsive to said detecting. The dynamically reconfiguring modem operation may include configuring the modem so as to maintain system synchronization.

In another aspect, the present invention relates to systems and apparatus to perform the above-described methods.

In another aspect, the present invention relates to machine-readable media containing instructions for causing a processor to perform the above-described methods.

In another aspect, the present invention relates to means for performing the above-described methods.

Various additional aspects, details, features, and functions are further described below in conjunction with the appended Drawings.

BRIEF DESCRIPTION OF THE DRAWINGS

The present invention is more fully appreciated in connection with the following detailed description taken in conjunction with the accompanying drawings, wherein.

DETAILED DESCRIPTION OF EMBODIMENTS

Overview

Figure 1:
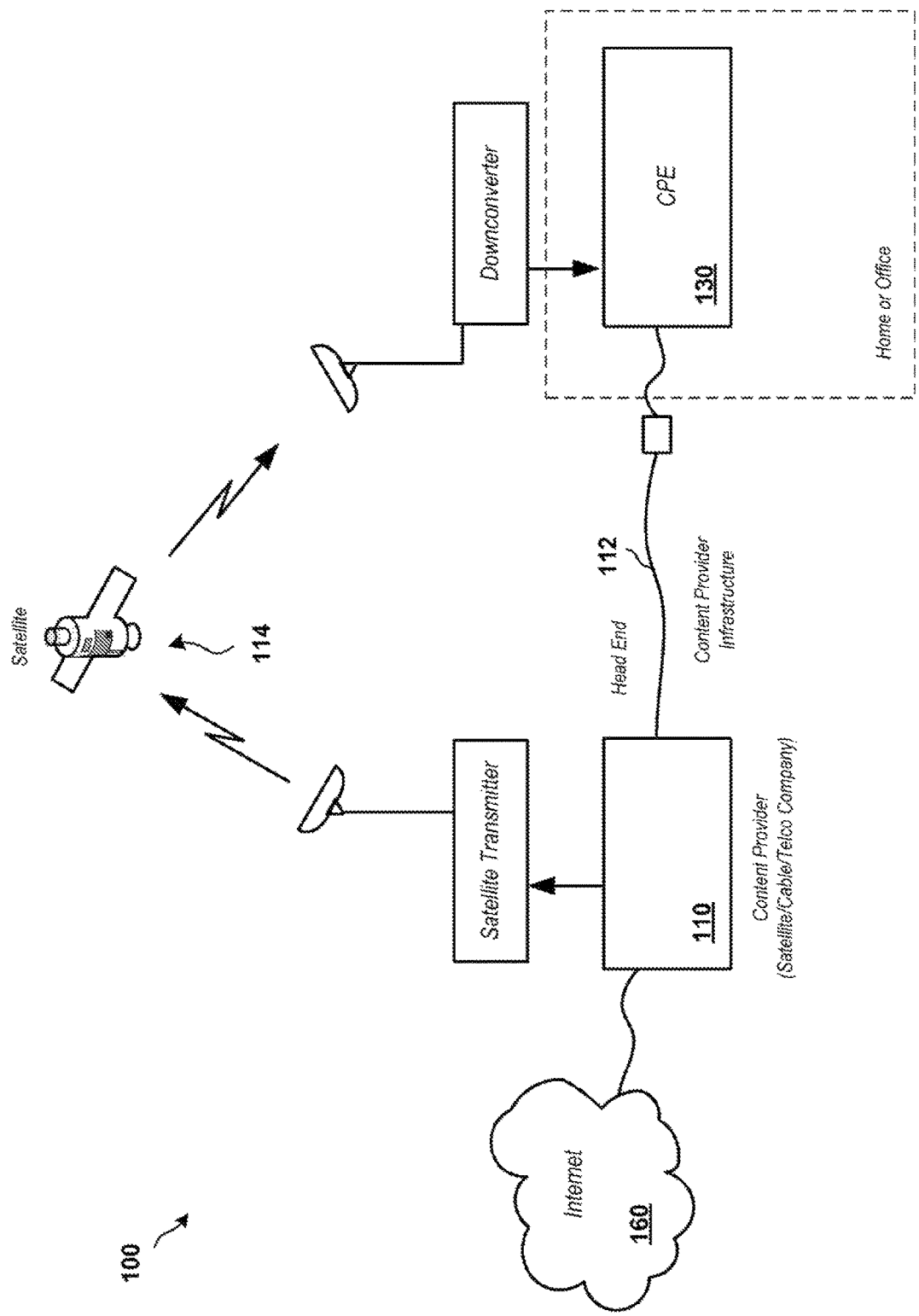
FIG. 1 illustrates a typical communications system on which embodiments of the present invention may be implemented.

Various aspects of the present invention are described below. It should be apparent that the teachings herein may be embodied in a wide variety of forms and that any specific structure, function, or both being disclosed herein is merely representative and not intended to in any way be limiting. Based on the teachings herein one skilled in the art should appreciate that an aspect disclosed herein may be implemented independently of any other aspects and that two or more of these aspects may be combined in various ways. For example, an apparatus may be implemented as part of a system or method and may be practiced using any number of the aspects set forth herein. In addition, such an apparatus may be implemented or such a method may be practiced using other structure, functionality, or structure and functionality in addition to or other than one or more of the aspects set forth herein.

As used herein, the term "exemplary" means "serving as an example, instance, or illustration." Any embodiment described herein as "exemplary" should not necessarily to be construed as preferred or advantageous over other embodiments.

The present invention is directed generally to methods and apparatus for controlling power in data communications systems and associated components such as cable modems. More particularly, but not exclusively, the present invention is directed toward dynamic adjustment of channel bonding as well as dynamic control of modem operation responsive to user demand. Although the description which follows is described primarily in the context of a downstream (receive path) of a communications system, the techniques described may be applied equally to upstream paths in other various other implementations.

One exemplary application to which embodiments may be applied is in cable distribution systems. In cable video distribution it is often desirable to receive several cable channels at once to provide multichannel functions such as picture in picture, watch-and-record, and distribution of multiple video channels throughout the home for consumption by several end users. For example, in the Data Over Cable Service Interface Specification (DOCSIS) Version 3.0 standard physical layer (PHY), the customer premise equipment (CPE) must receive several channels distributed throughout the cable spectrum, demodulate the signals and combine the resulting data from each channel in a process called "channel bonding." As used herein, this set of bonded channels may be referred to as a "bonded channel set." A bonded channel set may have a particular number of channels that may be adjusted up or down, and may have a particular configuration of channels that may also be adjusted by adding, removing, and/or re-arranging channels in the bonded configuration.

While channel bonding offers a higher data rate, this comes at the cost of additional power consumption. Accordingly, one aspect relates to adaptively reducing the power consumption of a data communications system. In various embodiments, this may be done by using one or more of the following non-exclusive approaches:

Adaptively reducing the number of bonded channels in the bonded channel set as user activity or user demand for bandwidth reduces. This may be accompanied by shutting down portions of the system, such as components of a cable data modem or other device, that are unused as a result. This may be combined with increasing the number of bonded channels in the bonded channel set when demand or activity resumes.

Providing for seamlessly switching from a bonded channel configuration to a single channel configuration for extremely low power operation so as to permit a primary channel to continue to operate with minimal or no interruption of service.

Shutting down a data modem when user activity or demand for bandwidth is low, and awakening or minimally powering the modem only to maintain system synchronization and system information as required, in order to allow the data modem to quickly power up whenever user activity resumes.

Attention is now directed to FIG. 1 which illustrates high level details of a data communications system 100 on which embodiments of the present invention may be implemented. System 100 includes a content provider system 110 configured for distribution of content to a plurality of users. System 100 may be a cable provider, satellite provider, telecommunications (telecom) company, or other entity that provides data, such as audio, video, Internet content or other types of data to users.

The user data may be distributed by one or more wired channels 112, such as via telecom or cable provider coaxial wired or optical distributions systems. Alternately and/or in addition, data may be distributed by a satellite channel 114 or other wireless communication channels (not shown). At the user end, customer premises equipment (also referred to generally herein as CPE) may include a cable or satellite data modem, gateway or other device residing in the customer premises. As one example, in a cable system a cable modem may be used to transmit and receive data from a public or private network, such as a cable company. This may be done through channel 112 and content provider 110, which may be further connected to the Internet 160. Other networking configurations (not shown) may alternately be used to provide content to end users.

The CPE 130 typically communicates with a service provider's infrastructure (which may be referred to generally as the "head end"), which then connects to a wider network such as the Internet 160 or a private network (not shown).

Figure 2:
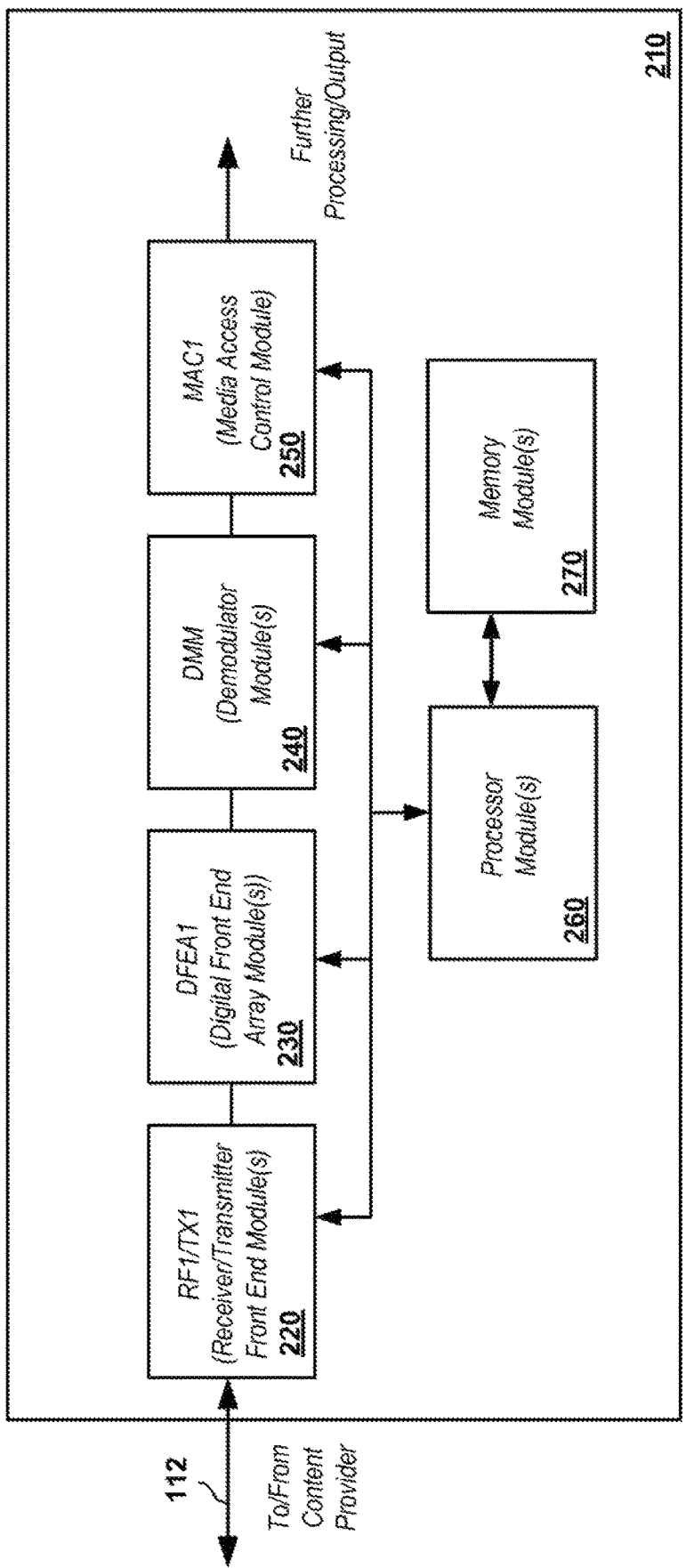
FIG. 2 illustrates a high level example of a cable modem configuration.

A cable data modem typically includes a transmitter and receiver sub-system as well as other subsystems, which may be in the form of various modules. A high level example implementation of a cable model 210 is illustrated in FIG. 2. A typical cable modem includes a receiver sub-system or module and a transmitter sub-system or module configured to manage receive and transmit functions respectively. These modules and associated functions may be implemented as part of a a channel bonding module and a bandwidth adjustment module configured to perform the channel bonding and bandwidth adjustment functions described subsequently herein. Various elements of these sub-systems may be combined or may be integral or discrete components in different implementations. In addition, a modem may include one or more processor modules comprising processors, digital signal processors (DSPs), ASICs, or other programmable or logical devices and associated memory module(s) to facilitate performance of the various processing functions described subsequently herein.

For example, in the implementation shown in FIG. 2, cable modem 210 includes a combined RF receive/transmit front end module which provides a signal to a baseband demodulator module or modules, which is coupled to a medium access control (MAC) processor or other device, such as MAC1 260 to provide MAC functions. DFEA1 230 comprises signal processing blocks which may be configured to perform signal processing functions such as those described subsequently. These functions may include, for example, filtering, scaling, impairment removal (such as, for example, in-phase/quadrature (I/Q) imbalance removal, DC offset removal, frequency translation to select a plurality of channels, as well as other functions. Frequency translation may be used to select channels frf1 thru frf4 as shown in FIG. 3.

Module DMM1 240 may comprise additional processing blocks that may include digital modems with channel equalization, synchronization, demapping and channel decoding. For example, in a DOCSIS implementation, DMM1 240 would include arrays of QAM demodulators compliant with the relevant modulated signaling specification(s). One or more processor modules 260 may be coupled to the various modules 220, 230, 240, 250, and/or other modules (not shown) to monitor and/or control functionality provided by the various modules. One or more memory modules 270 may be coupled to the processor module(s) 260, and/or to other modules (not shown) to store data, processor instructions, and/or other information.

The receive sub-system may be configured as part of a channel bonding module or function to bond channels distributed throughout the provided spectral bandwidth. An example of this channel bonding is illustrated in FIG. 3, which illustrates bonded channels frf1, frf2, frf3, and frf4 distributed throughout a provided spectral bandwidth BW1 (other channels that are not bonded are shown in white). This distribution may be in an ordered or periodic configuration, but is typically arbitrary. Bonding channels frf1 through frf4 may be used to combine their individual data capacities into an aggregate capacity which is the sum of the individual capacities.

Figure 3:
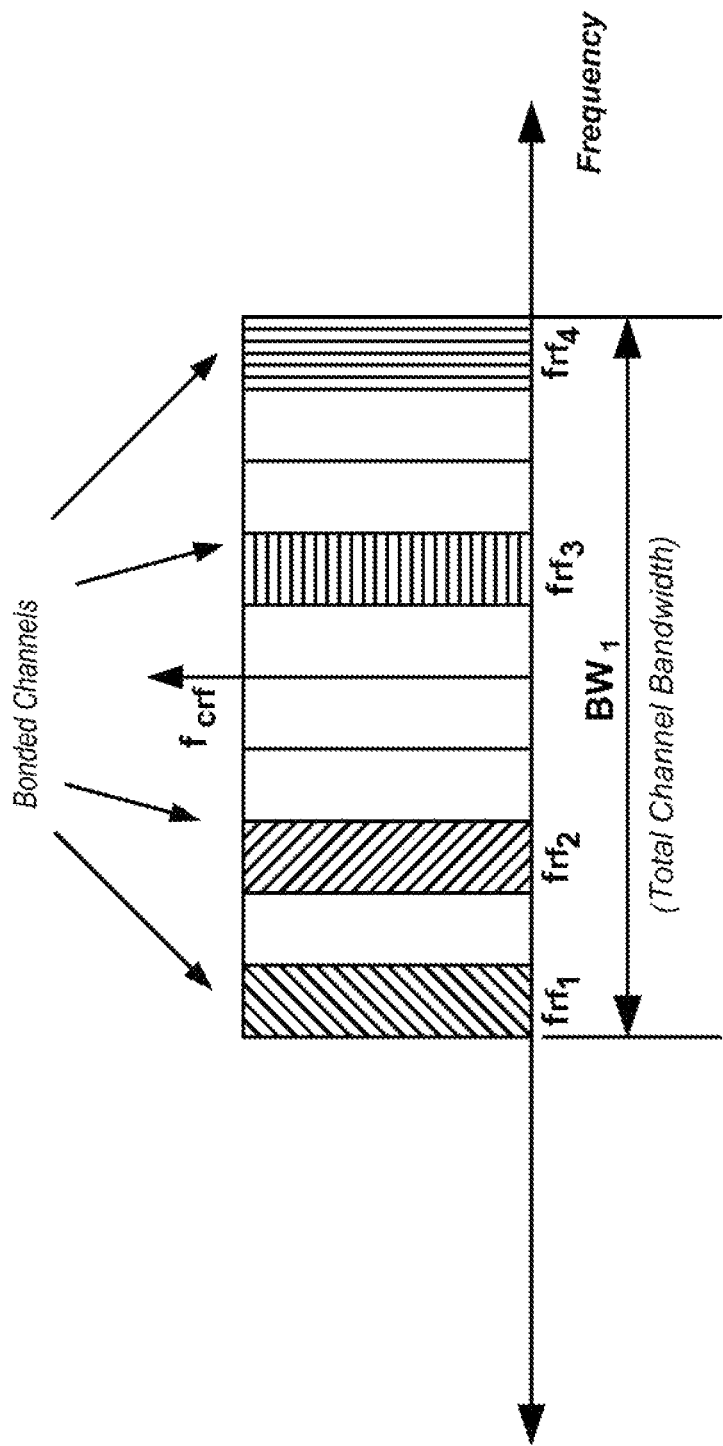
FIG. 3 illustrates an example of channel bonding.

It is noted that the example shown in FIG. 3 shows the bonding of four channels, as is defined in, for example, the DOCSIS 3.0 specification, which is incorporated by reference herein, but it should be apparent to one of skill in the art that various embodiments are equally applicable to larger numbers or configurations of channels. For example, other numbers may be necessary to support a consumer demand when an appliance, computer, or other device needs to support high-bandwidth applications such as high-definition video on demand, video streaming, or data applications.

In many systems, including those based on the DOCSIS 3.0 standard, a basic level of service is required even under power outage situations. DOCSIS 3.0 satisfies this requirement by implementing a so-called primary channel, which is a single narrowband channel (for example, the primary channel may be channel frf1 as shown in FIG. 3) which allows communication between the CPE and the service provider's infrastructure, even in the event of a power outage, though at lower power and lower bandwidth (relative to normal operation). The location of the primary channel is generally known to the modem.

In some applications, such as in the consumer environment, the data needs of the users tend to be very bursty (i.e., data requirements may be high for certain periods of time and then minimal during other time periods). For example, demand for bandwidth may be extremely high on evenings and weekends when users are at home and viewing video content, but during other time periods bandwidth demand may be more modest. In addition, during much of the late night and daytime a typical cable modem in the home may be idle or nearly idle (since users are typically asleep or inactive). There are obviously other times when demand may be high for some period of time and then minimal or even idle during others, such as during daytime periods in a home when nobody is present, etc.). As used herein, these time periods may be referred to generally as "high demand times," "low demand times," and "idle times" respectively. Adjustment of bandwidth responsive to a particular demand, predicted demand or other power or bandwidth criteria may be facilitated by a bandwidth adjustment module configured to perform the bandwidth adjustment functionality described subsequently herein.

Figure 4:
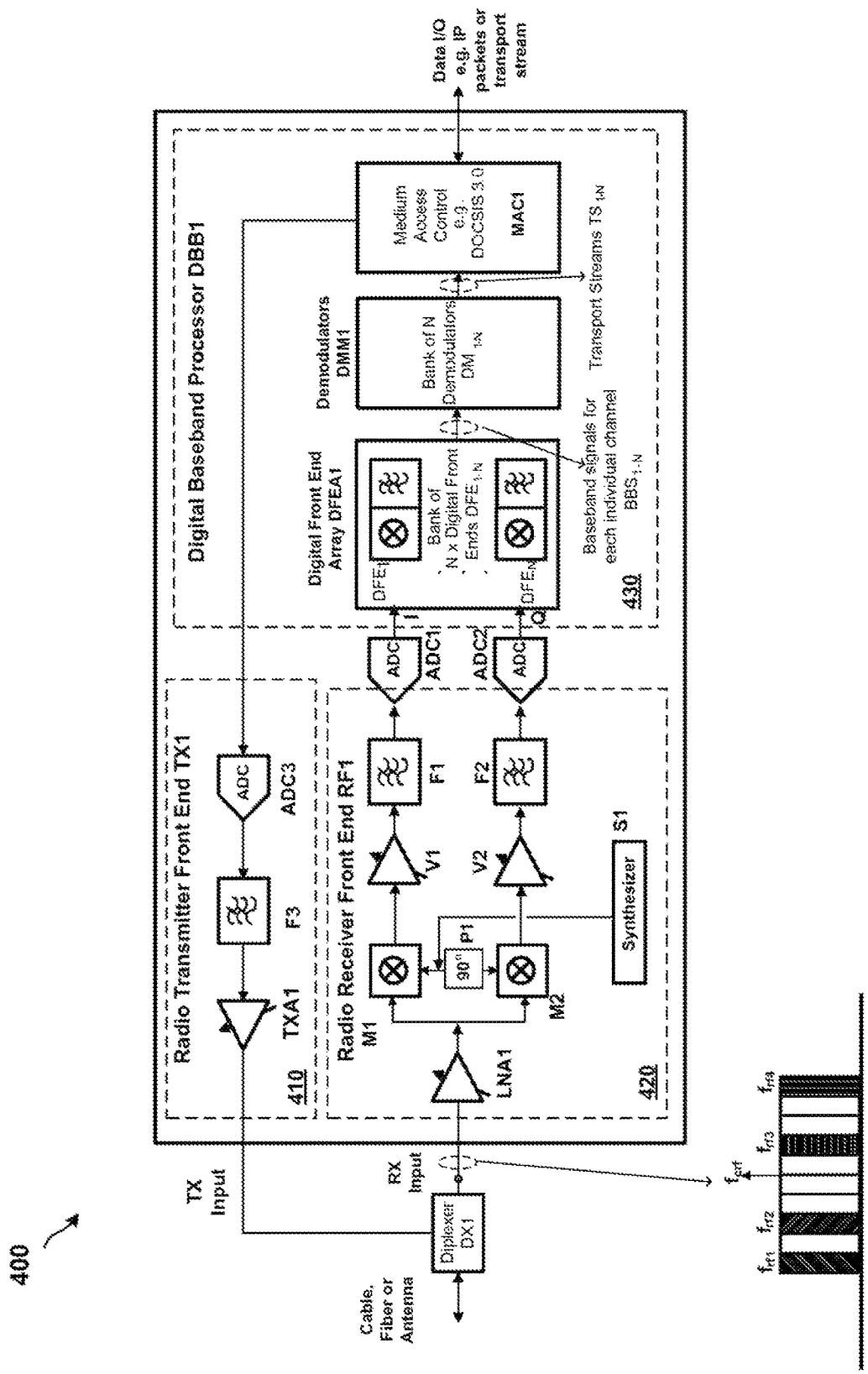
FIG. 4 illustrates an embodiment of a modem as may be used in a cable system.

FIG. 4 illustrates details of an exemplary implementation of a data modem 400 that may be used for applications such as cable systems for distribution of data, video, audio, and/or other content or information. The illustrated modem 400 may be implemented on a single chip in some embodiments, or may be implemented using multiple components, devices, modules, or elements in other implementations. In the example shown in FIG. 4, Modem 400 is shown as a simplified direct conversion receiver that includes a radio receiver front end 420, a digital baseband processor 430 and a radio transmitter front end 410 (other elements, such as one processor modules, memory modules, and/or other modules or components as are known or developed in the art are omitted for clarity).

The receive signal path in the example modem embodiment of FIG. 4 includes low-noise amplifier LNA1, complex I/Q signal path consisting of mixer M1/2, amplifier V1/2, filter F1/2 and analog to digital data converter ADC1/2. A synthesizer S1 is used to generate signals for mixer elements M1/2. RF1 converts BW1 to baseband and converts the signal via ADC1 and ADC2, feeding an array of digital front ends DFEA1, including DFE1-DFEN, which correspond with in-phase (I) and quadrature (Q) signals. DFEA1 translates, filters, scales and removes the impairments in channels frf1-frf4 to optimize demodulation in the array of demodulators DMM1.

Figure 5:
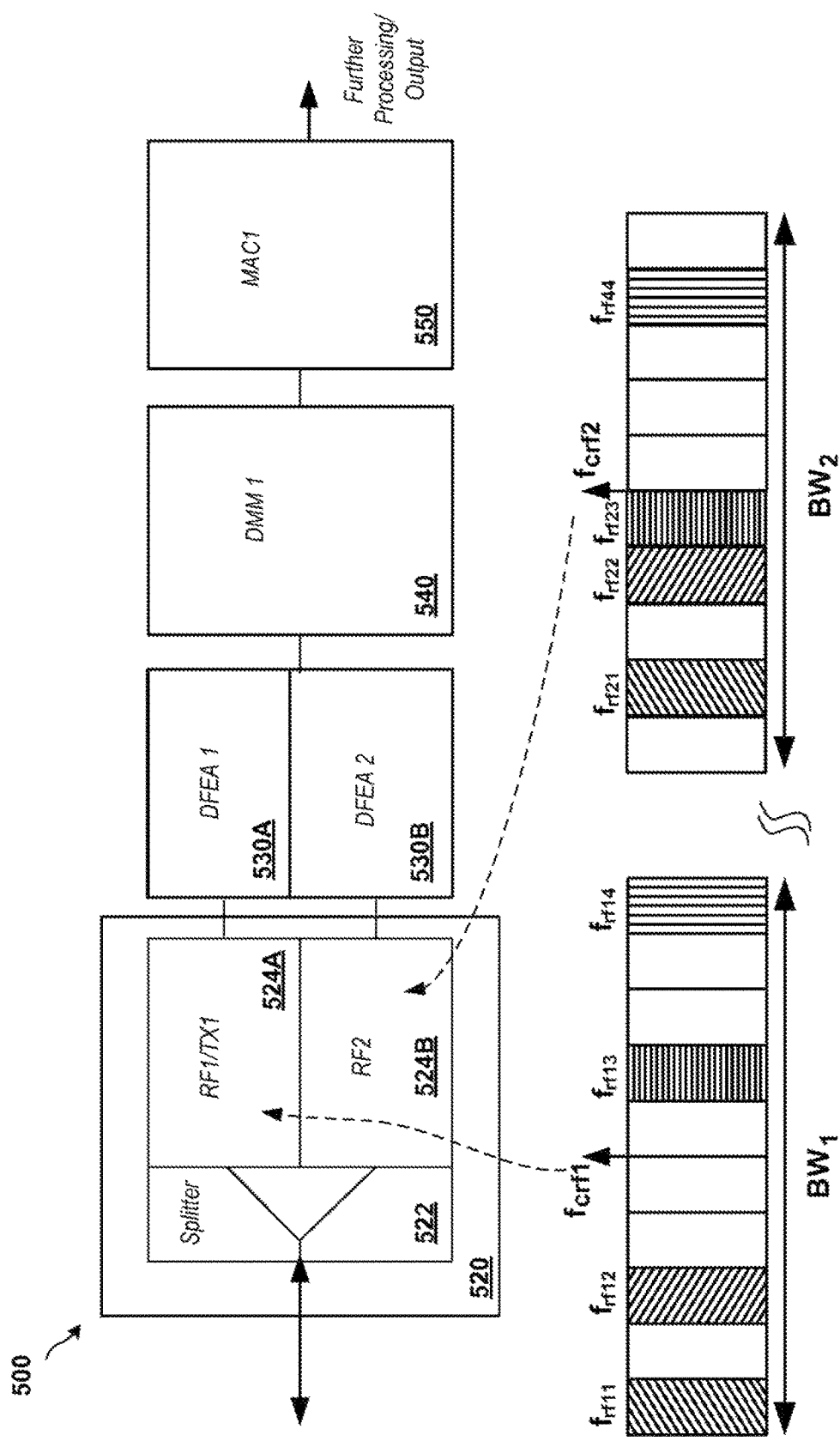
FIG. 5 illustrates details of multi-bandwidth channel bonding and bonding adjustment.

In some modem implementations multiple RF front ends may be used to process wideband sections of spectrum. An example implementation is shown in FIG. 5, which illustrates details of a cable modem implementation 500 having multiple RE front ends 524A and 524B coupled to a signal splitter 522 and digital front end arrays 530A and 530B. In the illustrated example two RF front ends are shown; however, it will be apparent to one of skill in the art that other numbers of front ends may also be provided. In modem 500, two RE front ends are combined to form a system that can receive two different (e.g., non-overlapping), or overlapping, wideband sections of input signal spectrum. These are shown as BW1 and BW2. In various embodiments of the present invention, this concept may be used with other configurations and different numbers of RF front ends. In addition, it is noted that in the RF front end shown in FIG. 5 a frequency conversion step or element is shown; however, the present invention is also applicable to systems without such a step (i.e. a broadband data converter-based receiver).

As noted previously, various embodiments may be used to facilitate power reduction in the CPE. Two general classes of operation or modes of operation consistent with the present invention may be implemented. These are denoted generally herein as bandwidth reduction modes and time slicing modes. In various implementations these modes may be combined, in whole or in part. Details of aspects of each of these modes are further described below.

Bandwidth Reduction Mode Implementations

In this operating mode, the CPE decreases the number of bonded channels in order to reduce its power consumption under certain conditions. By way of example, the modem implementation shown in FIG. 4 illustrates components that may be used for this mode and which may be part of a bandwidth adjustment module or function. In one implementation, the bandwidth of filters F1 and F2, as shown in FIG. 4, may be dynamically reduced in response to power and/or data throughput requirements. Alternately and/or in addition, the bandwidth and sample rate of ADC1 and ADC2 may be reduced. This reduction may be implemented by tuning F1 and F2 and reducing the clock rate at which ADC1 and ADC2 operate. Alternately or in addition, bandwidth reduction may be implemented by including within these blocks, or other elements of the modem (not shown), additional circuits or circuit elements that are capable of operating at reduce bandwidths with greater power efficiency.

For example, in one embodiment, the filters and ADC are configured to switch from operating in wideband mode to handle bandwidth BW1, and can switch into a narrowband mode which only captures a single channel, such as, for example, the bandwidth of frf1 as shown in FIG. 3. In general, an implementation of a process of switching to narrowband mode from wideband mode or vice versa will involve sensing or detecting current operational demands as well as current signals or requests for bandwidth reduction or increase. These may be used alone or alternately be coupled with statistical operational information, such as information on past bandwidth usage trends, periodic requirements for increase/decrease and/or other known or determined usage characteristics. For example, in some implementations daily usage trends may be tracked and used to determine when to increase or decrease bandwidth (such as in the morning, midday, and in the evening, based on past usage). This statistical information may be used alone and/or combined with current usage data to make a bandwidth adjustment decision.

In some implementations, the configuration of bonded channels may also be changed to facilitate power reduction. For example, particular channels bundled in a first bundled channel configuration may be different from channels in a second bundled channel configuration, even if the aggregate number of channels has remained the same.

Figure 7:
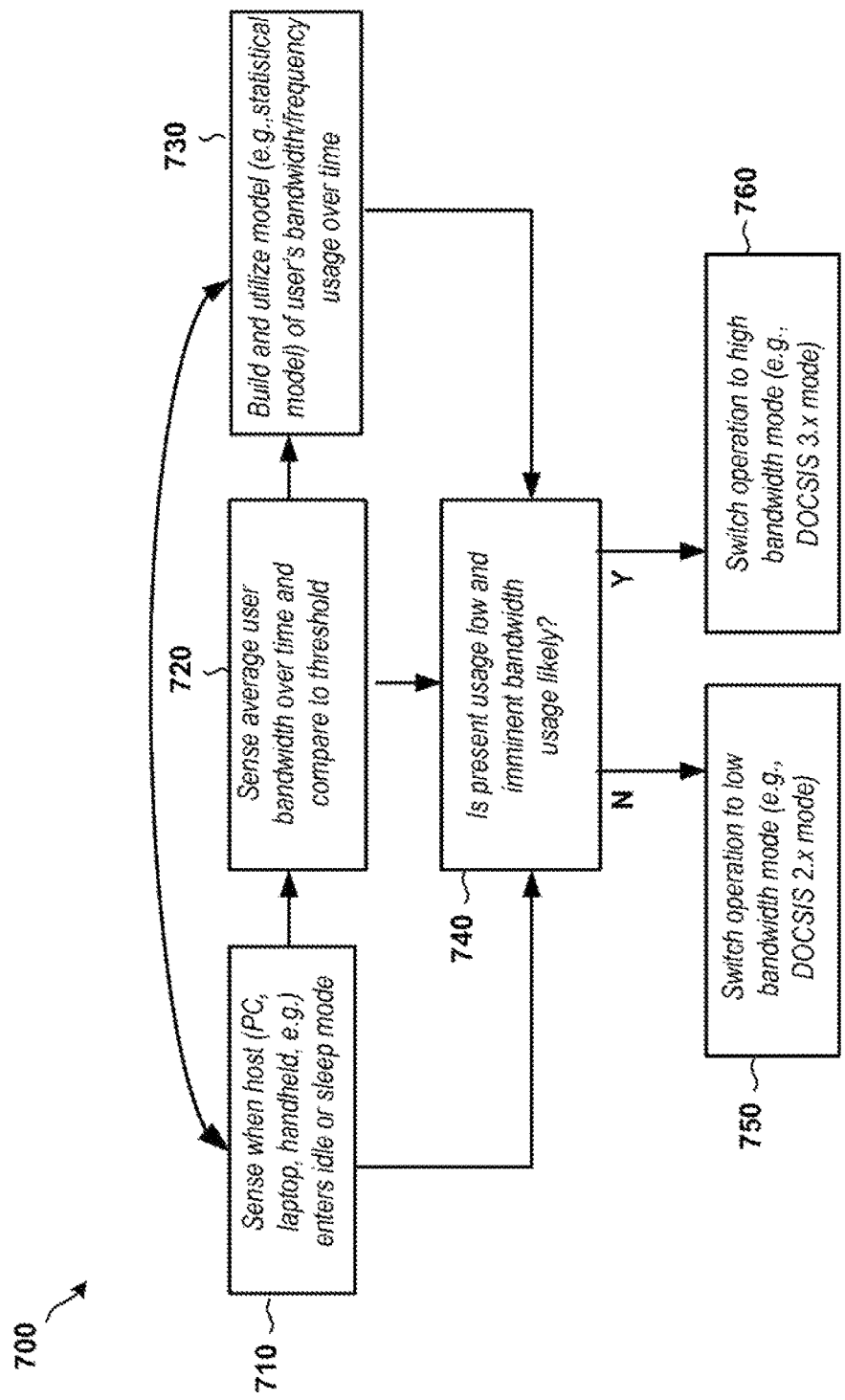
FIG. 7 illustrates an embodiment of a process for reducing power consumption in a modem.

One example of an embodiment of a process 700 for implementing a bandwidth reduction or increase is shown in FIG. 7. At stage 710, a determination is made that the host has entered an idle or sleep mode or may otherwise be transitioned to low bandwidth operation (or in some cases, from a low bandwidth usage to higher usage). This may be done by, for example, monitoring operational data traffic and/or applying previously monitored traffic information to a data traffic model, which may be, for example, based on a time of day or other usage parameter or condition.

Information associated with this determination or sensing may then be provided to stage 730 and/or stage 740. Stage 720 may be operated in parallel with overall device operation so as to determine average user bandwidth over time and set thresholds and/or other parameters that may then be used by other stages of process 700. In particular, the information may be used by stage 730 to build a statistical model of a user/device's bandwidth usage over time, as well as make a comparison between statistical information and current operation provided from stage 710. This may be done in conjunction with processor and memory modules (not shown) in a modem, such as the modem shown in FIG. 4. The statistical information may be used to generate or provide a bandwidth adjustment request bandwidth adjustment requirement, which may be used by various components of a modem, such as those illustrated in FIG. 2 or FIG. 4, to adjust bandwidth and/or adjust channel bonding and/or configuration.

In addition, information generated at stage 720 may be utilized at stage 740 to make a determination as to whether present usage is low and/or whether bandwidth/usage may increase (based on, for example information provided from stage 710 and/or other inputs (not shown)). If it is determined that bandwidth demand/usage is likely to decrease or stay at a lowered level, a bandwidth adjustment requirement, request, message or other signaling may then be generated and used to change operation of the modem. For example, operation of the device may then be switched to a lower bandwidth mode at stage 750.

In an exemplary implementation, operation in a cable modem system may be switched to a DOCSIS 2.x (e.g., DOCSIS 2.0) mode at stage 750 which may be in accordance with the DOCSIS 2.0 specification, which is incorporated by reference herein. Alternately, if it is determined that bandwidth usage may increase or has increased, operation may be switched at stage 760 to a wideband or higher bandwidth mode, such as from a DOCSIS 2.x mode to DOCSIS 3.x mode. It will be apparent to one of ordinary skill in the art that other variations of the process 700 as shown in FIG. 7 may alternately be used, and the example shown is for purposes of illustration, not limitation.

Figure 8:
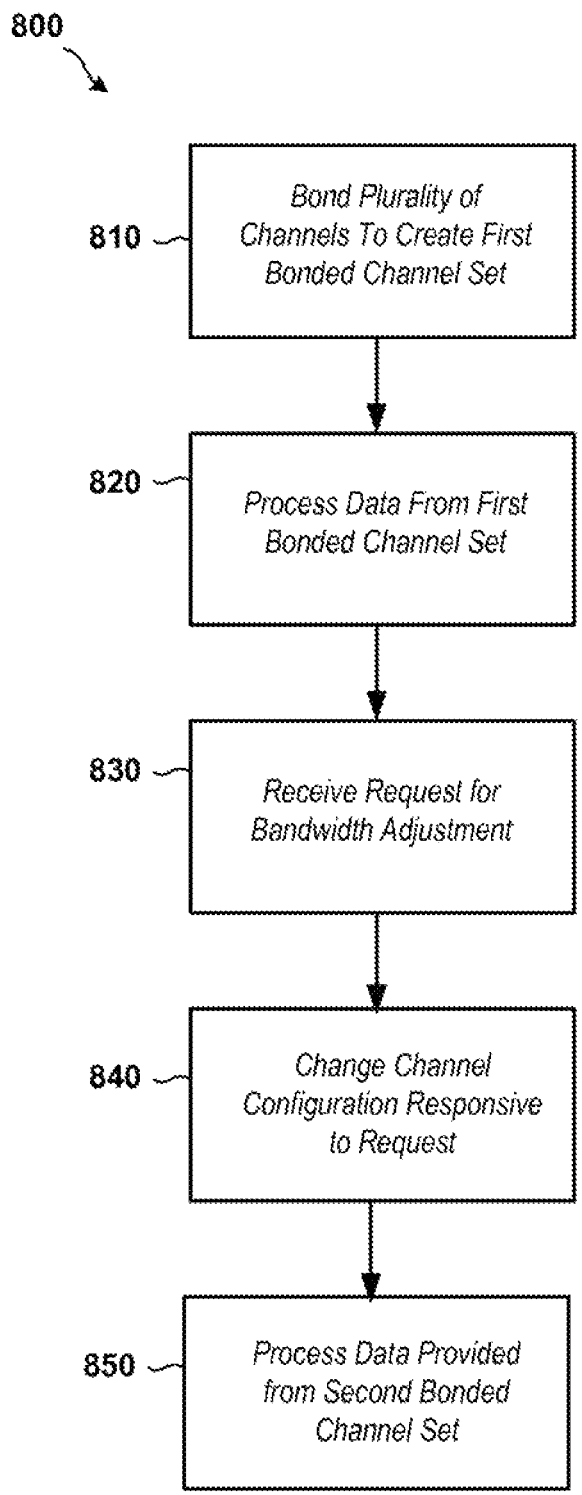
FIG. 8 illustrates an embodiment of a process for reducing power consumption in a modem.

FIG. 8 illustrates details of an exemplary process 800 that may be implemented in a device such as a cable modem for adjusting modem operation for power control. At stage 810, a plurality of channels may be bonded to create a first bonded channel set having a first number of channels. At stage 820, data provided from the first bonded channel set may be processed in the modem. The processing may include, for example, providing output baseband data from modulated data received from one or more of the channels, and/or providing images, video, audio, and/or other data or information. At stage 830, a request for bandwidth adjustment may be received. At stage 840, responsive to the request for bandwidth adjustment, the number of channels in the first bonded channel set may be changed so as to define a second bonded channel set having a second number of channels. At stage 850, data provided from the second bonded channel set may be processed in the modem.

The request for bandwidth adjustment may, for example, be associated with a requirement to reduce power consumption, which may be, for example, a signal, data, statistical usage information, and/or other information related to channel adjustment and/or power adjustment. The first number of channels may be greater than the second number of channels. The request for bandwidth adjustment may be associated with a requirement to reduce data throughput, and the first number of channels may be greater than the second number of channels.

The process 800 may further include, for example, receiving a second requirement for bandwidth adjustment associated with a requirement to increase data throughput, and increasing the number of channels in the second bonded channel set so as to define a third bonded channel set having a third number of channels greater than the number of channels in the second bonded channel set. The request for bandwidth adjustment may be associated with a requirement to increase data throughput, and the first number of channels may be smaller than the second number of channels.

The process 800 may further include, for example, dynamically adjusting a bandwidth of a front end filter so as to facilitate processing of the second bonded channel set. The process may further include dynamically adjusting the clock rate of an analog-to-digital converter. The second bonded channel set may consist of a single channel. The single channel may be a primary channel associated with the cable system. The process may further include adjusting the configuration of channels in the first bonded channel set so as to define the second bonded channel set.

Idle Detection Mode Implementations

In some implementations a data modem may be configured to operate in an Idle Detection Mode. In this mode, the modem detects when the data demand of the end user has fallen below a set of thresholds that the operator can set dynamically, or program once, which may be done periodically or asynchronously. In one implementation, this includes sensing data traffic to the end user, performing filtering (such as averaging) to estimate the level of traffic more reliably, and comparing it to one or more thresholds. For each of the thresholds, the modem may then switch to an operational mode with successively reduced data rates, performance, and/or power consumption (typically all three).

For example, in one implementation a single threshold, below which the modem signals to the head end that it wishes to change transmission modes, such as switching from DOCSIS 3 (which bonds 4 channels) to DOCSIS 2 (which only occupies a single channel), may be used. In general, it is important that the modem maintain a connection with the head end via one of the bonded channels, e.g. the primary channel, through a handoff procedure (as is described in one example further below) which reduces the performance of the modem to the point where it meets the reduced specifications of DOCSIS 2.x mode operation.

When increased activity is subsequently sensed, this process may be reversed, and the modem operation reconfigured to adjust its data rate, performance and hence power consumption to meet the increased requirements. This may be done by, for example, the processes shown and illustrated with respect to FIGS. 7 and 8.

Figure 9:
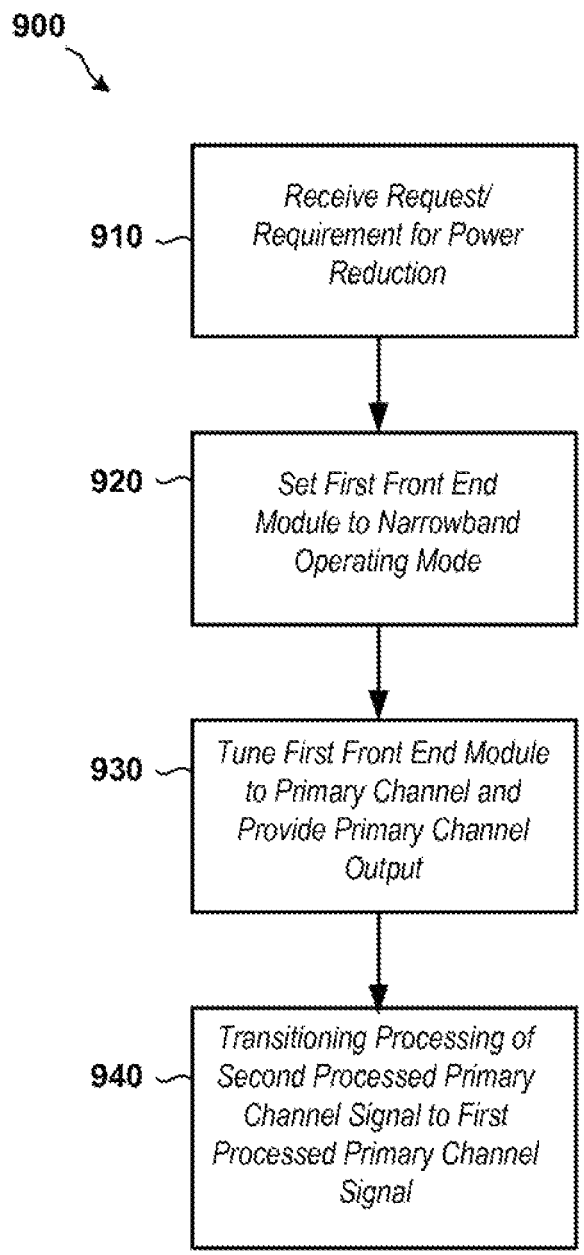
FIG. 9 illustrates an embodiment of a process for transitioning channel processing in a modem.

FIG. 9 illustrates details of an exemplary process 900 that may be used to facilitate power reduction in a modem including a plurality of receiver front end modules configured to process a plurality of sets of bonded channels, At stage 910, a request for power reduction may be received. At stage 920, a first front end module of the plurality of front end modules may be set to a narrowband operating mode. At stage 930, the first front end module may be tuned to a primary channel and a first processed primary channel output may be provided. A second front end module of the plurality of front end modules may be configured to receive the primary channel and provide, as an output, a second processed primary channel signal to a demodulator module. At stage 940, processing in the demodulation module of the second processed primary channel signal may be transitioned to the first processed primary channel signal.

The process may further include, for example, reducing power consumption of the second front end module after said transitioning. The reducing power consumption may include turning off the second front end module.

Example Handoff Procedure

Handoff is an example of a process by which the modem can reduce its performance and power consumption without causing interruptions in a desired data channel such as the primary data channel. For example, as shown in FIG. 5, a system may be receiving signals in channels frf11-14 and frf21-24, and may desire to reduce its power consumption to receive only the primary channel, which is illustrates as being located at frf11 (for purposes of explanation—the primary channel may also be located at other channels).

A typical operating scenario may be follows: radio front ends RF1 and RF2 (524A and 542B) are initially configured to operate in wideband mode. At some point an event requiring or implicating operation in a low power mode occurs. For example, a power outage may prompts the CPE to go into low power mode in order to receive only the primary channel.

Figure 6:
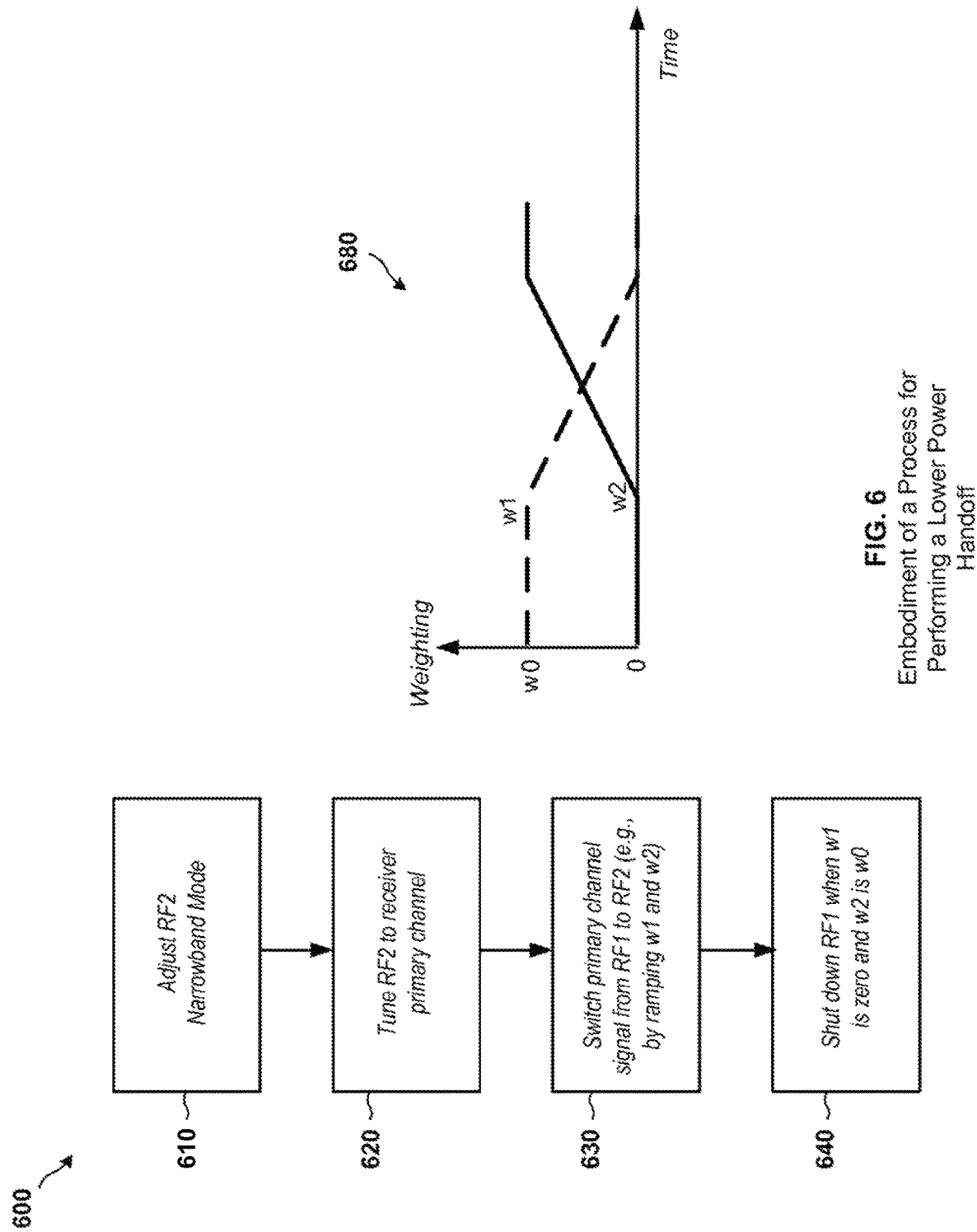
FIG. 6 illustrates an embodiment of a process for transitioning operation to a low power, narrowband mode in modem.

Such a handoff process may be implemented, in one embodiment, using process 600 as described below (and illustrated at a high level in FIG. 6). A circuit as shown in FIG. 5 may be used for this implementation. Alternately circuits or modules capable of providing similar or equivalent functionality may also be used in some embodiments. As shown in FIG. 5, a radio front end, RFE 520, includes a splitter module 522, along with a first module (RF1/TX1 524A) configured to process bonded channels as shown in BW1, as well as a second module RF2 524B configured to process a second set of bonded channels as shown in BW2.

Process 600 may be implemented as follows. At stage 610 RF2 524B may be adjusted so that it enters a narrowband operating mode. At stage 620, RF2 524B may be tuned so that it receives the primary channel (frf11 in this example) and delivers it to a digital front end, such as DFE2 530B. It may be desirable to ensure that the frequency translation of primary channel frf11 to baseband introduced by RF2 and DFE2 results in a baseband signal with phase and frequency offset which are matched to the frequency translation of the primary channel received by RF1 and digital front end DFEA1 530A. For example, if RF1, RF2, DFE1 and DFE2 are mutually synchronous (i.e., derived from the same time base), this means selecting the frequencies and phase shifts introduced by RF2 and DFE2 such that they equal the frequency and phase shifts introduced by RF1 and DFE1.

Some mismatch of frequency or phase may be tolerable by the demodulator, however it is generally preferable to minimize the mismatch to avoid having the demodulator lose lock to the primary channel.

Once this processing is completed, RF2 is receiving only the primary channel frfl1, narrowband mode, while RF1 is still wideband mode and receiving bonded channels in BW1 (i.e., frfl1-frfl2). That is, the DFEA elements (including DFEA 1 530A and DFEA 2 530B as shown in FIG. 5) are receiving a redundant copy of the primary channel via RF2. At this point DMM1 is still demodulating the primary channel supplied by RF1 via the DFEA 1 and the channel received by MDM2 is not yet being used.

At stage 630, the primary channel signal may be switched from RF1 to RF2. For example, DFEA1 530A may seamlessly switch from supplying to DMM1 540 the primary channel received from RF1 524A to the redundant copy received from RF2 524B. This can be done by ensuring that the gain and phase of the primary channel through RF2 is aligned with the gain and phase through the primary channel, although the steps below may be used to make precise alignment unnecessary.

In one implementations, the primary channel signal being fed to the demodulator in, for example, DMM1 may be set to be a weighted combination of the primary channel signals from RF1 and RF2. Defining BBSprimary as the total primary signal being sent to a demodulator in DMM1 supporting the primary channel, BBSprimary1 as the primary signal received by RF1 through DFEA1, BBSprimary2 as the primary signal received by RF2 through DFEA1, BBSprimary1 and BBSprimary2 may be subject to gain control which adjust their levels to reach predetermined values, within hysteresis or other variation in the system.

w1 and w2 may be weighting factors with values between a scaling constant w0 (e.g. in one embodiment having a value of 1) and 0. The following relationship may be used:

$$BBSprimary=w1*BBSprimary1+w2*BBSprimary2$$

Weighting factors may be ramped in a gradual manner so as not to perturb the demodulator. For example, weighting factor w1 may start at a value of 1 (w0) and ramp down to 0 linearly, at the same time that w2 starts at a value of 0 and ramps up to 1 linearly, over a period of, for example, 300 ms. This is illustrated in diagram 680 of FIG. 6.

Finally, at stage 640, the CPE may shut down RF1, leaving only RF2 operating in narrowband mode and supplying the primary channel to DMM1, allowing CPE to consume lower power.

Though the above description is described in the context of a two-receiver implementation, this approach can easily be extended to a multiplicity of N receivers where N>2. Alternately step 1 and 2 can be transposed or combined.

Returning to FIG. 6, assuming two operating RF stages with different bonded channels (RF1 and RF2 in this example, however, as noted previously more than 2 stages may be used in various implementations), at stage 610, upon detection of an event indicating or requiring reduced power operation, the second RF stage (RF2) may be switched to a lower power narrowband mode. Assuming RF2 is processing a set of bonded channels that are different from those being processed by the first RF stage (i.e., RF1), operation of RF2 in the narrowband mode may be switched to tune a desired or primary channel being processed in parallel by RF1 at stage 620. If RF2 is also processing the desired or primary channel, stage 620 may be omitted.

At stage 630, downstream processing may be seamlessly switched from RF1 to RF2. This may be done in various ways. In one example, as shown in FIG. 6, a ramped or weighted transition in output signals may be performed, with signals weighted and combined to form the transition. Alternately, if the signals are properly synchronized, switching may be done instantly or via another signal combining method. After stage 630, with processing now being done on the primary or desired channel provided through narrowband configuration of RF2, the first RF stage (i.e., RF1) may be shut off or operated in a reduced power mode at stage 640.

Time-Slicing Modes

In some implementations, when the user bandwidth demands enter an idle or low-demand state, the relatively low bandwidth requirement may be managed by entering into a low duty-cycle mode of operation. In one implementation of this mode, a CPE may be configured to wake up periodically to maintain up-to-date medium access control information with the infrastructure. This mode of operation may be used to allow for potentially substantially reduced CPE power consumption while also allowing the CPE to quickly ramp up data delivery when activity resumes. In a typical implementation, data delivery may be ramped up quickly, without a noticeable user delay.

In some configurations, the communication systems and apparatus described herein include means for performing various functions as described herein. In one aspect, the aforementioned means may be a processor or processors and associated memory in which embodiments reside, and which are configured to perform the functions recited by the aforementioned means. The aforementioned means may be, for example, processor and/or memory modules or apparatus residing in modems to perform the functions described herein. In another aspect, the aforementioned means may be a module or apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein. It is intended that the following claims and their equivalents define the scope of the disclosure.

What is claimed:

1. A method comprising:
    bonding a plurality of channels to create a first bonded channel set that comprise a primary channel and one or more secondary channels, wherein said primary channel is configurable to operate with minimal or no interruption of service;
    responsive to a request for bandwidth adjustment, adjusting a number of channels in said first bonded channel set so as to define a second bonded channel set that comprises said primary channel, wherein said request for bandwidth adjustment is associated with a requirement to reduce data throughput; and
    processing data received via said primary channel or a secondary channel using timing related information determined based on said primary channel.

2. The method of claim 1, wherein said request for bandwidth adjustment is associated with a requirement to reduce power consumption.

3. The method of claim 1, wherein said request for bandwidth adjustment is generated in response to a determination that bandwidth usage on said first bonded channel set is low and is unlikely to increase for a period of time.

4. The method of claim 1, further comprising:
    receiving a second request for bandwidth adjustment; and
    adjusting a number of channels in said second bonded channel set so as to define a third bonded channel set comprising said primary channel and one or more secondary channels.

5. The method of claim 4, wherein said second request for bandwidth adjustment is generated in response to a determination that bandwidth usage on said second bonded channel set is likely to increase.

6. The method of claim 1, further comprising dynamically adjusting a bandwidth of filtering applied to facilitate processing of said second bonded channel set.

7. The method of claim 1, further comprising dynamically adjusting a clock rate of analog-to-digital conversion applied to facilitate processing of said second bonded channel set.

8. The method of claim 1, further comprising:
    monitoring received traffic;
    generating a statistical usage model based on said monitoring; and
    controlling a number of bonded channels based on said statistical usage model.

9. A device comprising:
    circuitry operable to:
        bond a plurality of channels to create a first bonded channel set that comprise a primary channel and one or more secondary channels, wherein said primary channel is configurable to operate with minimal or no interruption of service;
        responsive to a request for bandwidth adjustment, adjust a number of channels in said first bonded channel set so as to define a second bonded channel set that comprises said primary channel, wherein said request for bandwidth adjustment is associated with a requirement to reduce data throughput; and process data received via said primary channel or a secondary channel using timing related information determined based on said primary channel.

10. The device of claim 9, wherein said request for bandwidth adjustment is associated with a requirement to reduce power consumption.

11. The device of claim 9, wherein said request for bandwidth adjustment is generated in response to a determination that bandwidth usage on said first bonded channel set is low and is unlikely to increase for a period of time.

12. The device of claim 9, wherein said circuitry is further operable to:
receive a second request for bandwidth adjustment; and
adjust a number of channels in said second bonded channel set so as to define a third bonded channel set comprising said primary channel and one or more secondary channels.

13. The device of claim 12, wherein said second request for bandwidth adjustment is generated in response to a determination that bandwidth usage on said second bonded channel set is likely to increase.

14. The device of claim 9, wherein said circuitry is further operable to dynamically adjust a bandwidth of a front-end filter in said device so as to facilitate processing of said second bonded channel set.

15. The device of claim 9, wherein said circuitry is further operable to dynamically adjust a clock rate of an analog-to-digital converter in said device so as to facilitate processing of said second bonded channel set.

16. The device of claim 9, wherein said circuitry is further operable to:
monitor traffic received in said device;
generate a statistical usage model based on said monitoring; and
control a number of bonded channels based on said statistical usage model.

17. A method comprising:
bonding a plurality of channels to create a first bonded channel set that comprise a primary channel and one or more secondary channels, wherein said primary channel is configurable to operate with minimal or no interruption of service;
responsive to a request for bandwidth adjustment, adjusting a number of channels in said first bonded channel set so as to define a second bonded channel set that comprises said primary channel, wherein said request for bandwidth adjustment is generated in response to a determination that bandwidth usage on said first bonded channel set is low and is unlikely to increase for a period of time; and
processing data received via said primary channel or a secondary channel using timing related information determined based on said primary channel.

18. A method comprising:
bonding a plurality of channels to create a first bonded channel set that comprise a primary channel and one or more secondary channels, wherein said primary channel is configurable to operate with minimal or no interruption of service;
responsive to a request for bandwidth adjustment, adjusting a number of channels in said first bonded channel set so as to define a second bonded channel set that comprises said primary channel;
processing data received via said primary channel or a secondary channel using timing related information determined based on said primary channel; and
dynamically adjusting a bandwidth of filtering applied to facilitate processing of said second bonded channel set.

19. A method comprising:
bonding a plurality of channels to create a first bonded channel set that comprise a primary channel and one or more secondary channels, wherein said primary channel is configurable to operate with minimal or no interruption of service;
responsive to a request for bandwidth adjustment, adjusting a number of channels in said first bonded channel set so as to define a second bonded channel set that comprises said primary channel;
processing data received via said primary channel or a secondary channel using timing related information determined based on said primary channel; and
dynamically adjusting a clock rate of analog-to-digital conversion applied to facilitate processing of said second bonded channel set.

20. A method comprising:
bonding a plurality of channels to create a first bonded channel set that comprise a primary channel and one or more secondary channels, wherein said primary channel is configurable to operate with minimal or no interruption of service;
responsive to a request for bandwidth adjustment, adjusting a number of channels in said first bonded channel set so as to define a second bonded channel set that comprises said primary channel;
processing data received via said primary channel or a secondary channel using timing related information determined based on said primary channel;
monitoring received traffic;
generating a statistical usage model based on said monitoring; and
controlling a number of bonded channels based on said statistical usage model.

21. A device comprising:
circuitry operable to:
bond a plurality of channels to create a first bonded channel set that comprise a primary channel and one or more secondary channels, wherein said primary channel is configurable to operate with minimal or no interruption of service;
responsive to a request for bandwidth adjustment, adjust a number of channels in said first bonded channel set so as to define a second bonded channel set that comprises said primary channel, wherein said request for bandwidth adjustment is generated in response to a determination that bandwidth usage on said first bonded channel set is low and is unlikely to increase for a period of time; and
process data received via said primary channel or a secondary channel using timing related information determined based on said primary channel.

22. A device comprising:
circuitry operable to:
bond a plurality of channels to create a first bonded channel set that comprise a primary channel and one or more secondary channels, wherein said primary channel is configurable to operate with minimal or no interruption of service;
responsive to a request for bandwidth adjustment, adjust a number of channels in said first bonded channel set so as to define a second bonded channel set that comprises said primary channel;

process data received via said primary channel or a secondary channel using timing related information determined based on said primary channel; and dynamically adjust a bandwidth of a front-end filter in said device so as to facilitate processing of said second bonded channel set.

23. A device comprising:

circuitry operable to:

bond a plurality of channels to create a first bonded channel set that comprise a primary channel and one or more secondary channels, wherein said primary channel is configurable to operate with minimal or no interruption of service;

responsive to a request for bandwidth adjustment, adjust a number of channels in said first bonded channel set so as to define a second bonded channel set that comprises said primary channel;

process data received via said primary channel or a secondary channel using timing related information determined based on said primary channel; and dynamically adjust a clock rate of an analog-to-digital converter in said device so as to facilitate processing of said second bonded channel set.

24. A device comprising:

circuitry operable to:

bond a plurality of channels to create a first bonded channel set that comprise a primary channel and one or more secondary channels, wherein said primary channel is configurable to operate with minimal or no interruption of service;

responsive to a request for bandwidth adjustment, adjust a number of channels in said first bonded channel set so as to define a second bonded channel set that comprises said primary channel;

process data received via said primary channel or a secondary channel using timing related information determined based on said primary channel;

monitor traffic received in said device;

generate a statistical usage model based on said monitoring; and control a number of bonded channels based on said statistical usage model.

* * * * *